(12) United States Patent
Verman et al.

(10) Patent No.: US 8,126,117 B2
(45) Date of Patent: Feb. 28, 2012

(54) MULTI-BEAM X-RAY SYSTEM

(75) Inventors: Boris Verman, Bloomfield, MI (US);
Michael Young, Canton, MI (US); Licai Jiang, Rochester Hill, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 207 days.

(21) Appl. No.: 12/699,493

(22) Filed: Feb. 3, 2010

(65) Prior Publication Data

US 2011/0188636 A1   Aug. 4, 2011

(51) Int. Cl.
*H01J 35/04*   (2006.01)
*H01J 35/30*   (2006.01)
*G21K 1/00*   (2006.01)
*G21K 1/02*   (2006.01)

(52) U.S. Cl. ......... 378/135; 378/145; 378/137; 378/147

(58) Field of Classification Search ............ 378/43, 378/70, 71, 84, 150, 135, 137, 145, 147
See application file for complete search history.

(56) References Cited

U.S. PATENT DOCUMENTS

| | | | |
|---|---|---|---|
| 5,022,064 A * | 6/1991 | Iketaki | 378/145 |
| 6,041,099 A | 3/2000 | Gutman et al. | |
| 6,421,417 B1 | 7/2002 | Jiang et al. | |
| 7,317,784 B2 | 1/2008 | Durst et al. | |
| 7,542,548 B2 * | 6/2009 | Matsuo et al. | 378/84 |
| 7,720,197 B2 * | 5/2010 | Jiang | 378/84 |
| 2004/0190681 A1 | 9/2004 | Omote | |
| 2007/0165780 A1 | 7/2007 | Durst et al. | |
| 2007/0236815 A1 | 10/2007 | Wings et al. | |
| 2008/0084966 A1 | 4/2008 | Aoki et al. | |
| 2008/0095319 A1 | 4/2008 | Grodzins et al. | |

OTHER PUBLICATIONS

M. Schuster et al., *Application of Graded Multilayers in X-ray Diffraction*, Advances in X-Ray Analysis, vol. 42: Proceedings of the 47$^{th}$ Annual Conference on Applications of X-Ray Analysis, Aug. 3-7, 1998, pp. 57-71.

* cited by examiner

*Primary Examiner* — Irakli Kiknadze
(74) *Attorney, Agent, or Firm* — Brinks Hofer Gilson & Lione

(57) ABSTRACT

A multi-beam x-ray system includes an x-ray source which emits x-rays and a housing with a first part and a second part. The second part is moveable relative to the first part and includes a plurality of optics of different performance characteristics. Each optic, through the movement of the second part relative to the first part, is positioned to a working position so that the optic receives the x-rays from the x-ray source and directs the x-rays with the desired performance attributes to a desired location.

14 Claims, 4 Drawing Sheets

MULTI-BEAM X-RAY SYSTEM

BACKGROUND OF THE INVENTION

Typical x-ray analytical instruments include an x-ray source and an x-ray optical system that provide an x-ray probe beam. Characteristics of the probe beam determine the characteristics and capabilities of the instrument. Performance parameters of the probe beam include divergence for spatial definition, bandwidth for energy definition, and intensity for a given cross section. These parameters, however, cannot be independently optimized, since improving one parameter often reduces the performance of the other parameters. Most x-ray probe beams use characteristic emission lines that result from the interaction between target atoms and accelerated electrons. The spectrum that an optical system can deliver is limited by the available spectrum from a specific target.

Current technologies in x-ray sources and x-ray optics cannot deliver an ideal probe beam, which has the attributes of absolute parallelism, very narrow energy bandwidth, variable wavelength, and very high intensity. Instead, different optical systems are constructed and arranged to deliver beams with different characteristics. Combined with different x-ray source designs, the optical systems deliver beams required for different instrument capabilities, functions, and applications. This approach usually involves multiple optical systems and even multiple x-ray tubes or multiple targets and, thus, is inconvenient to manage and is costly.

Some systems employ multilayer optics that include a bending mechanism to change the curvature of the multilayer optic for different wavelengths. Although such systems enable the use of different sources, mechanical systems which can reliably and accurately form a curvature matching a specific wavelength are difficult to fabricate. In addition, the multilayer optic which is designed to work with multiple wavelengths cannot be optimized for each specific wavelength.

These multilayer optic systems may also include multiple sections of optics in which each section is designed for a specific wavelength. The section of the optic is mechanically moved to the working position when a specific working wavelength is needed. However, these systems do not address issues associated with 2-dimensional cases.

Such multilayer optical systems further include multiple multilayer coating arrangements as a stack of structures, in which each structure is designed for a specific wavelength. Although these systems offer convenience and low cost, their performance is compromised because of the lower reflectivity for every specific wavelength and high background noise due to the Bragg reflections at different energies off different multilayer coating structures.

Other systems have been employed as 2-dimensional systems which include two 2-dimensional optics in a face-to-face arrangement. Each optic is designed for a different energy or wavelength. However, such an arrangement has one or both optics at a source take-off angle that is far from the ideal take-offs that are optimal for performance.

Even when the optics designed for the same energy, there might be a need for quickly changing the configuration among various beam configurations, such as parallel beam and focusing beam configurations.

Accordingly, a probe beam system which can deliver beams of different characteristics is needed.

BRIEF SUMMARY OF THE INVENTION

In one form, a multi-beam x-ray optical system includes an x-ray source which emits x-rays and a housing with a first part and a second part. The second part is moveable relative to the first part and includes a plurality of optics of different performance characteristics. Each optic, through the movement of the second part relative to the first part, is positioned to a working position so that the optic receives the x-rays from the x-ray source and directs the x-rays to a desired location.

The benefits of the x-ray optical system include improved functionalities, improved performance, enabled instrument capabilities, convenience and low cost.

Further features and advantages of this invention will become readily apparent to persons skilled in the art after a review of the following description, with reference to the drawings and claims that are appended to and form a part of this specification.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DESCRIPTION

An x-ray optical system capable of delivering beams with different characteristics is described herein. The optical system includes multiple optics, and each optic has unique performance characteristics for meeting different application needs. The beam characteristics may include variations in spatial definition, such as parallel beam optic and focusing optic, spectral differences, such as Cu Kα, Mo Kα, Ag Kα and other wavelengths, different trade-offs between divergence, and flux on the sample or all of above. The optical system delivers a specific beam when a corresponding optic is mechanically positioned to the desired optical path.

Figure 1A:
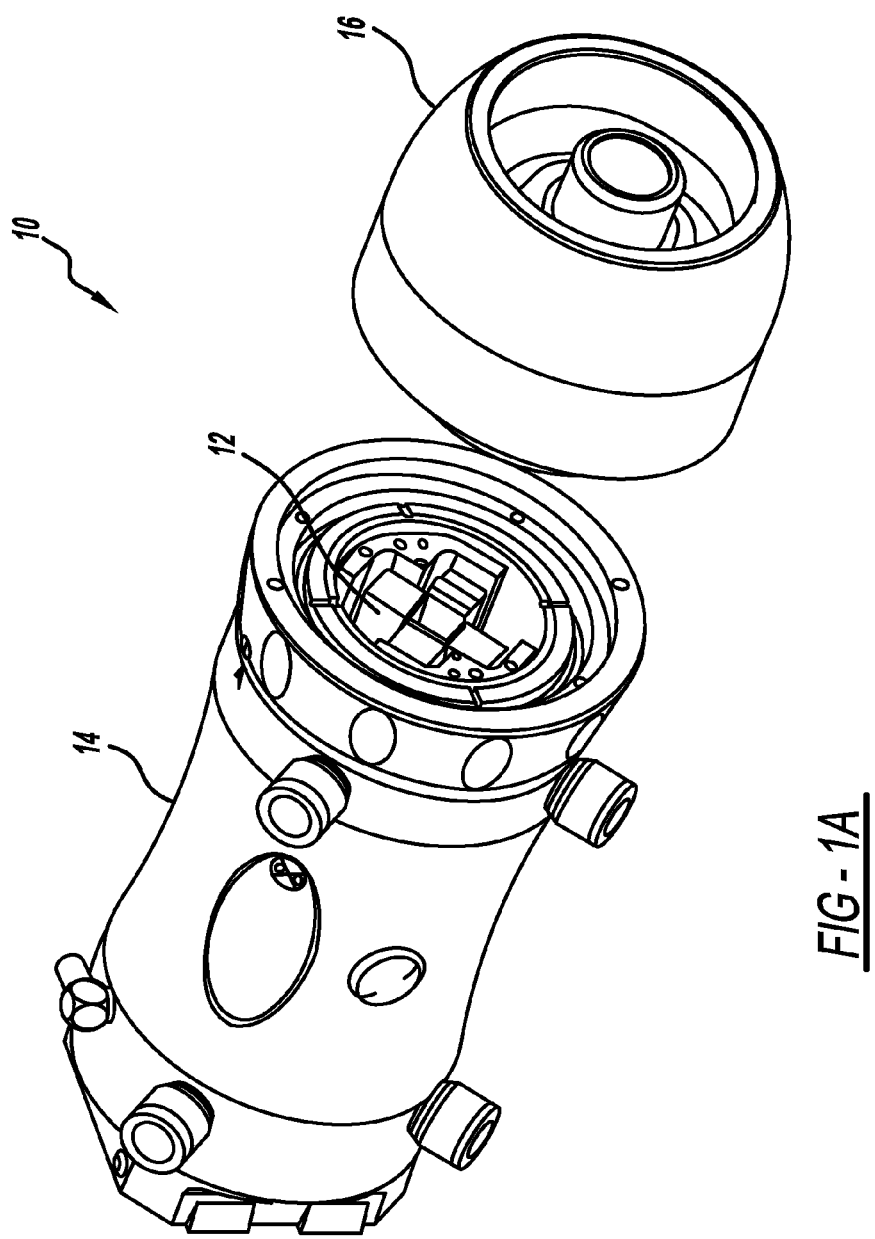
FIG. 1A is an expanded perspective view of a multi-beam x-ray system in accordance with the invention.
Figure 1B:
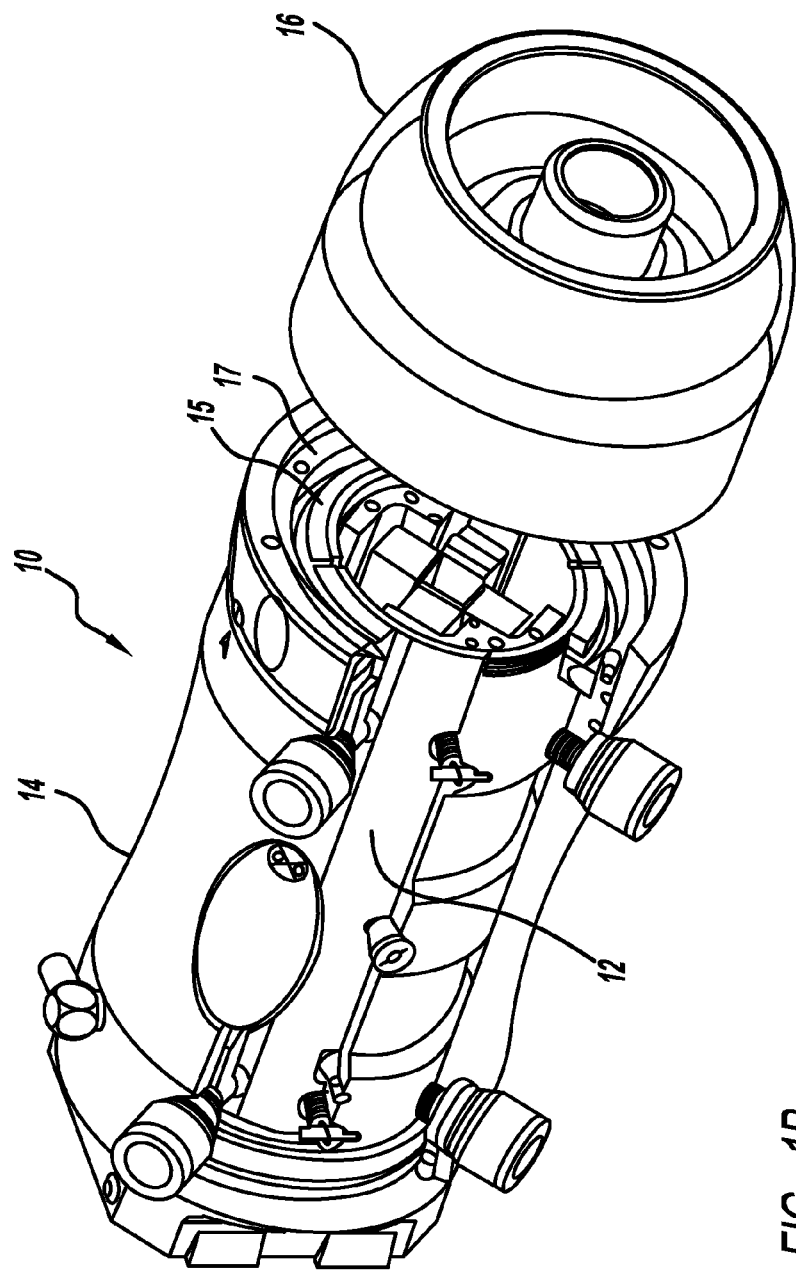
FIG. 1B is a cutaway view of the multi-beam x-ray system of FIG. 1A.

Referring now to FIGS. 1A and 1B, a multi-beam x-ray system embodying the principles of the present invention is illustrated therein and designated at 10. As its primary components, the x-ray system 10 includes an optical system 12 enclosed within a housing 14 and a cover 16.

The multi-beam x-ray system 10 employs a mechanism to position a specific optic to a desired working position, which is defined as the working position in which each optic, within certain constraints, has its optimized take-off angle, designed source-optic distance, matched source focal spot and optic focus, and correct Bragg angle. The constraints may include designed interception points of all beams, intended beam orientation and position, as well as any other desired constraints. In the arrangement shown in FIGS. 2A and 2B, the optical system 12 includes a rotating mechanism to position an optical element 18 with a pair of optics 20 and 22 to a desired working position, in which the optics 20 and 22 are arranged in a circular geometry and the optical system 12 is rotated around its axis so that each optic 20 and 22 is positioned in and out of the working position.

The optical element 18 may have a coarse alignment mechanism for each optic 20 and 22 so that the optics are aligned in such a way that when the system 10 is positioned for an optic in its working position, the optic 20 or 22 is coarsely aligned to the intended source focal spot 26 or 28 of a source 24 and the system 10. Alternatively or additionally, the optical system 12 and the optics 20 and 22 are fabricated so that when the optical system 12 is positioned for a desired optic in its working position, the optic is pre-aligned with an accuracy and precision of the coarse alignment to the intended source focal spot.

When in use, the source 24 emits x-rays from either source focal spot 26 or 28 at respective optics 22, 20 which in turn focuses the beam at a focus point 30, a detector, a sample, or any other suitable position. In particular, in the arrangement shown in FIGS. 2A and 2B, the housing 14, referred to as a rotary housing, has a structure with two shells 15 and 17 (FIG. 1B). The inner shell 15 provides multiple locations for the optics 20, 22 with different characteristics. The inner shell 15 can be rotated in either direction around the axis of the optical instrument 12 as indicated by the arrow 19 relative to the outer shell 17 so that either optic 20, 22 can be positioned to a pre-defined working position. As indicated above, each optic 20, 22 is pre-aligned or coarsely aligned relative to the respective source focal spot 28, 26 and intended direction or position when it is moved in the working position. Each optic 20, 22 may have its own coarse alignment mechanism or it can be factory installed in the optical system 12 with the precision of the coarse alignment mechanism. The stationary outer shell may be equipped with an alignment mechanism that provides all the needed alignment motions for fine alignment, which may include transverse translations across the primary beam direction, Bragg angle alignment, and optional translation along the primary beam.

Alternatively, the optical system 12 can be equipped with an alignment mechanism that provides all the needed alignment motions for fine alignment, which may include transverse translations across the primary beam direction, Bragg angle alignment, and optional translation along the primary beam.

Figure 3A:
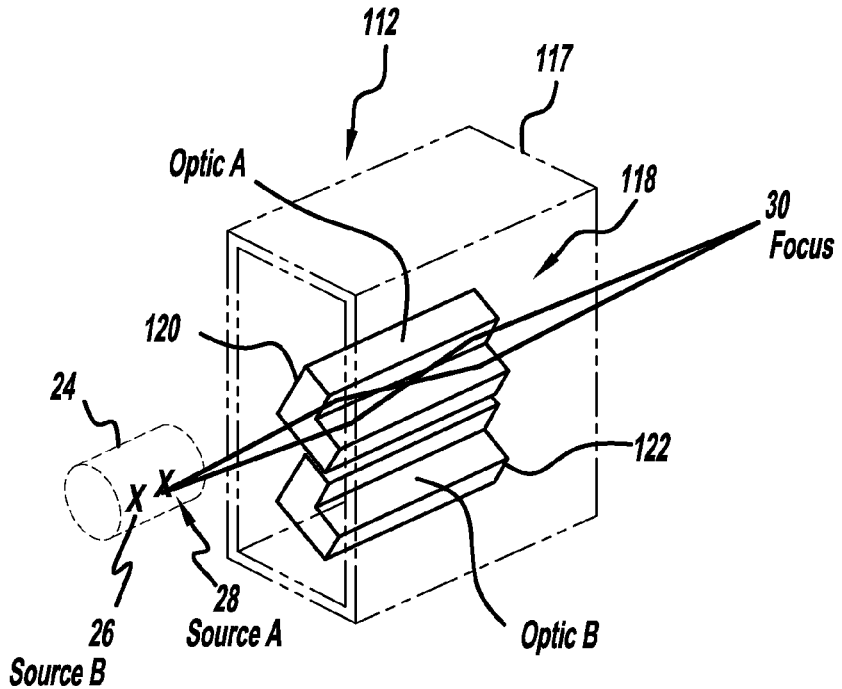
FIGS. 3A and 3B are schematic views of illustrating the principles of another embodiment of the multi-beam x-ray system.
Figure 3B:
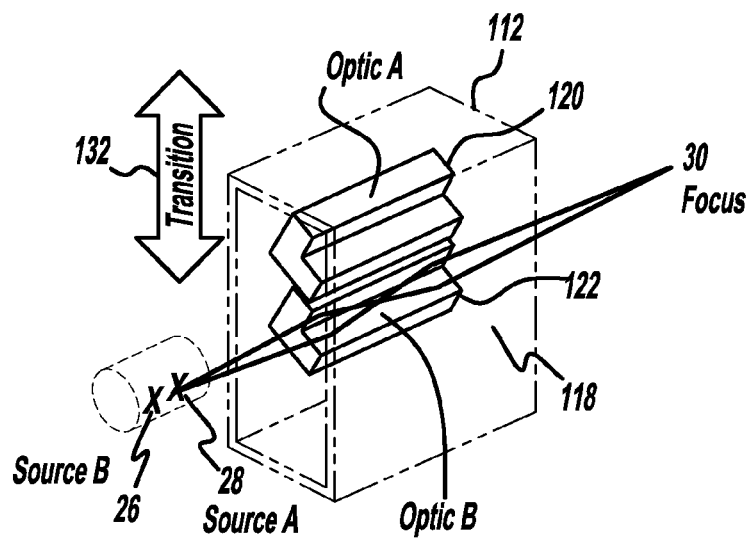

Another arrangement shown in FIGS. 3A and 3B illustrates an optical system 112 with a translation mechanism to position an optical element 118 with a pair of optics 120 and 122 back and forth as indicated by arrow 132 to the desired working position relative to an outer shell 117 all enclosed in housing similar to the housing 14 (FIG. 1A). The optics 120 and 122 are arranged in a linear array or a 2-dimensional matrix if more optics are included in the system, and a particular optic is translated to the working position. Similarly, the source 24 emits x-rays from either focal source point 26 or 28 at the respective optic 122, 128 which in turn focuses the beam at the focal point 30, a detector, a sample, or any other suitable position.

The optics 120, 122 have different properties such as different spatial definitions or different energies. For the case of different energies, the optics 120, 122 can be employed for different spectrums and can be aligned to different source focal spots. Each optic 120, 122 may be pre-aligned or coarsely aligned relative to the respective source spot 28, 26 and intended direction or position when the optic is positioned to its desired working position. Each optic 120, 122 may have its own coarse alignment mechanism or it may be factory installed with the precision of a defined coarse alignment. The housing 117 can be equipped with an alignment mechanism that provides all the desired alignment degrees of freedom for fine alignment, which may include transverse translations across the primary beam direction, Bragg angle alignments, and optional translation along the primary beam.

Alternatively, the optical system 112 can be equipped with its own alignment structure which provides all the desired alignment degrees of freedom for fine alignment, which may include transverse translations across the primary beam direction, Bragg angle alignments, and optional translation along the primary beam.

The optical arrangements discussed above can be employed with different target materials for forming two or more source focal spots with different emission characteristics. Each optic is aligned to a specific focal spot on a specific target material. A beam with a different wavelength is delivered by actuating a different target focal spot and using a slit to select the beam.

The optical system may be designed to provide beams with the same energy but difficult spatial characteristics, such as parallel beam and a focus beam. The arrangements in this case use the same target material and the same source spot.

The optical system can deliver multiple beams with mixed characteristics such that some beams have different energies and some beams have only different spatial definitions. In this case, multiple target materials and source emission spots can be employed and multiple optics can be aligned to a single source spot.

In any of the aforementioned arrangements, the x-ray source 24 is a point source having a single target material or multiple target materials. The x-ray sources (both sealed tubes and rotating anodes) with multiple target materials can include a target with multiple strips, each strip being a different target material. The source focal spots associated with different target materials can have different locations. Therefore, the x-rays optics can be designed for different target materials with different focal spots on the target. Alternatively, the target can be an alloy of different elements, which emits a spectrum including all the characteristic lines from all the elements. The optics can have the same focal spot regardless of the working wavelength.

When the x-ray source 24 is used with different target materials having a strip structure, the source 24 may include a cathode and the target may be mechanically movable so that the different target materials can be positioned to a desired focal spot where the electron beam interacts with the target. The electron beam can be electronically steered to different target materials so that different spectrums can be generated at different focal spots.

Figure 2A:
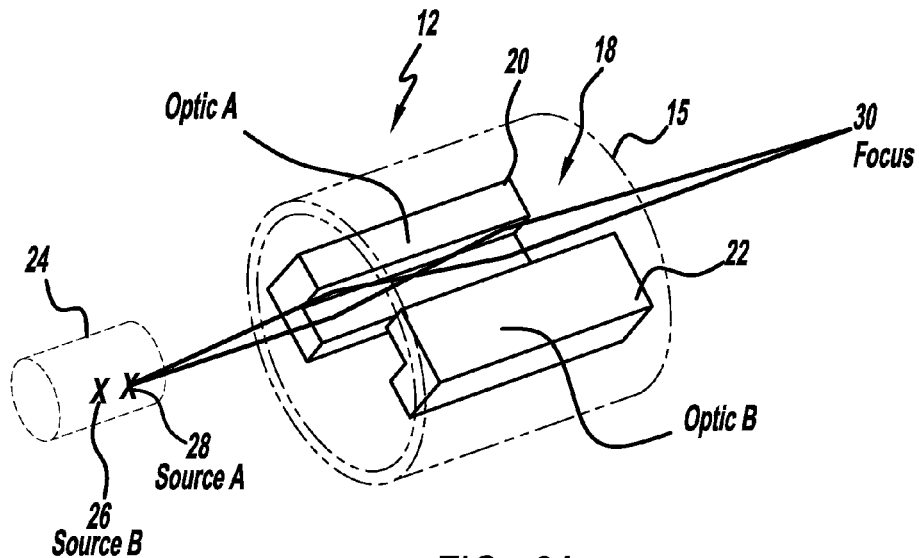
FIGS. 2A and 2B are schematic views illustrating the principles of the multi-beam x-ray system of FIG. 1A.
Figure 2B:
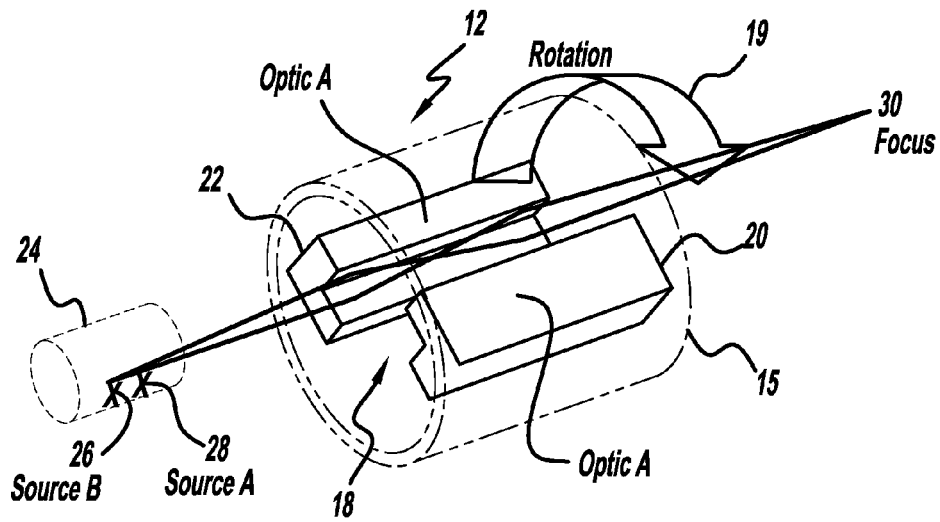

In a particular arrangement, the x-ray source 24 provides point projection and the system 10 includes a rotary housing with multiple 2-dimentional optics as shown in FIGS. 2A and 2B. The x-ray source has a single target and delivers different characteristic emission lines such as $K\alpha$ and $K\beta$. The optics can deliver beams with different spatial definitions such as parallel beams, focusing beams with different focal length, and beams with different spectral definitions such as different working wavelengths ($K\alpha$, $K\beta$, $L\alpha$ . . . ) and different bandwidths. Each optic can be rotated to the working position to deliver the designed beam characteristics.

In another arrangement, the x-ray source 24 delivers emission spectrums from one or multiple target materials, such as Cr $K\alpha/K\beta$, Cu $K\alpha/K\beta$, Mo $K\alpha/K\beta$, as well as others, and the system 10 includes a rotary housing with multiple 2-dimensional optics. Each optic is employed for a specific wavelength and/or has a set of specific characteristics. X-rays of a single target or different targets can be emitted from the same source spot, if it is a single target material or the target is made of mixed alloys, or different source points, if the source target consists of straps of different materials. Each optic is configured and coarsely aligned to have its focus aligned to the intended source focal spot and delivers a beam according to the direction and position designed. A rotation mechanism is able to position any optic in the circular structure to the working position. A fine alignment structure engages the optic in the working position to finely align the optic for optimal performance.

Yet in another arrangement, the x-ray source 24 delivers emission spectrums from one or multiple target materials, such as Cr Kα, Cu Kα/Kβ, Mo Kα/Kβ as well as others, and the optical system 10 includes a linear array or a matrix housing with multiple 2-dimensional optics (see, e.g., FIGS. 3A and 3B). Each optic is configured for a specific wavelength and/or has a set of specific characteristics. X-rays from a single target or different targets can be emitted from the same source spot, if it is a single target or the target is made of mixed alloys, or multiple source spots. Each optic is configured and coarsely aligned to have its focus aligned to the intended source focal spot and delivers a beam according to the desired direction and position. A translation mechanism positions any of the optics in the array or matrix to the working position. A fine alignment structure engages the optic in the working position to finely align the optic for optimal performance.

The x-ray source 24 may include an anode with different materials and a cathode that delivers an electron beam to different materials to form different source focal spots emitting different spectrums. The cathode can be an electron gun with an electro-magnetic deflection mechanism to steer the electron beam to different target materials. Alternatively, the anode can be repositionable so that different materials can be positioned under an electron beam to generate x-rays with different spectrums.

The optics can be multilayer optics. The multilayer optics can be graded multilayer optics and any combination of collimating optics and focusing optics with different focal lengths.

In certain implementations, each 2-dimensional optic is made of two 1-dimensional optics either in a sequential geometry such as in the Kirkpatrick-Baez scheme or in the "side-by-side" arrangement as described in U.S. Pat. Nos. 6,042,099 and 6,014,423, both of which are incorporated herein by reference in their entirety. The 2-dimensional optics can be single reflection optics having a paraboloidal geometry for collimating optics or an ellipsoidal geometry for focusing optics.

The aforementioned as well as other embodiments are within the following claims.

What is claimed is:

1. A multi-beam x-ray beam system comprising:
a point focus x-ray source; and
a housing with a first part and a second part, the second part being moveable relative to the first part, the second part including a plurality of 2-dimensional multilayer x-ray optics that condition the beam in two directions that are perpendicular to the axis of the x-ray beam, each optic, through the movement of the second part relative to the first part, being positioned to a working position so that the optic receives the x-rays from the x-ray source and directs the x-rays of different performance characteristics to a desired location.

2. The x-ray beam system of claim 1, wherein the second part includes a coarse alignment mechanism so that each optic is coarsely aligned when the optic is positioned to its working position, the optic being coarsely aligned to a desired source focal spot and with an intended beam direction and beam position.

3. The x-ray beam system of claim 1, wherein each optic is factory pre-aligned so that the optic is coarsely aligned to a desired source focal spot and with an intended beam direction and beam position.

4. The x-ray beam system of claim 1, wherein the first part includes an alignment mechanism to precisely align each optic when the optic is positioned to its working position, the optic being precisely aligned to a desired source focal spot and with an intended beam direction and beam position.

5. The x-ray beam system of claim 1, wherein the second part includes an alignment mechanism to precisely align each optic when the optic is positioned to its working position, the optic being precisely aligned to a desired source focal spot and with an intended beam direction and beam position.

6. The x-ray beam system of claim 1, wherein the optic housing is a rotary housing with an outer shell and an inner shell, the inner shell being the second part and the outer shell being the first part, the plurality of optics in the inner shell being in a circular geometry and being rotatable relative to the outer shell, each optic being positioned to its desired working position by rotating the inner shell relative to the outer shell.

7. The x-ray beam system of claim 1, wherein the optic housing is a housing with an outer shell being the first part, the second part with the plurality of optics having a linear array or a matrix structure and being movable relative to the outer shell, each optic being positioned to its working position by translating the second part relative to the outer shell.

8. The x-ray beam system of claim 1, wherein the x-ray source includes an anode with different target materials and a cathode that delivers an electron beam to the different materials to form different source focal spots that emit different spectrums.

9. The x-ray beam system of claim 8, wherein the cathode is an electron gun with an electro-magnetic deflection mechanism to steer the electron beam to the different target materials.

10. The x-ray beam system of claim 1, wherein the x-ray source includes an anode with different target materials and is repositionable so that the different materials are positioned under an electron beam to generate x-rays with different spectrums.

11. The x-ray beam system of claim 1, wherein the 2-dimensional multilayer x-ray optics are graded d-spacing multilayer optics.

12. The x-ray beam system of claim 11, wherein the graded multilayer optics are any combination of collimating optics and focusing optics with a different combination of performance attributes including divergence, focal length, working energy, and energy bandwidth.

13. The x-ray beam system of claim 11, wherein each of the 2-dimensional multilayer optics is made of two 1-dimensional optics either in a side-by-side geometry or in a sequential Kirkpatrick-Baez geometry.

14. The x-ray beam system of claim 11, wherein the 2-dimensional optics have a paraboloidal geometry for collimating the x-ray beams or an ellipsoidal geometry for focusing the x-ray beams.

* * * * *